United States Patent [19]

Takiyama et al.

[11] Patent Number: 5,198,529
[45] Date of Patent: Mar. 30, 1993

[54] HIGH MOLECULAR UNSATURATED POLYESTER

[75] Inventors: Eiichiro Takiyama, Kamakura; Yositaka Hatano, Higasikanbaragun, both of Japan

[73] Assignee: Showa Highpolymer Co., Ltd., Tokyo, Japan

[21] Appl. No.: 793,135

[22] Filed: Nov. 18, 1991

[30] Foreign Application Priority Data

Nov. 16, 1990 [JP] Japan .................. 2-308810
Nov. 16, 1990 [JP] Japan .................. 2-308811
Nov. 16, 1990 [JP] Japan .................. 2-308812

[51] Int. Cl.$^5$ .................................... C08G 63/78
[52] U.S. Cl. .................................. 528/272; 528/279;
528/302; 528/303; 528/306; 528/308;
528/308.6; 525/437
[58] Field of Search .............. 528/272, 279, 302, 303,
528/306, 308, 308.6; 525/437

[56] References Cited

U.S. PATENT DOCUMENTS 3,915,936 10/1975 Vollkommer et al. ............ 528/279
4,113,898 9/1978 Gardziella et al. ................. 427/195
4,334,035 6/1982 Fujita et al. ........................ 525/34

Primary Examiner—John Kight, III
Assistant Examiner—Sam A. Acquah
Attorney, Agent, or Firm—Sughrue, Mion, Zinn, Macpeak & Seas

[57] ABSTRACT

A high molecular weight unsaturated polyester having a number-average molecular weight of 5,000 or greater, the polyester being represented by a general formula:

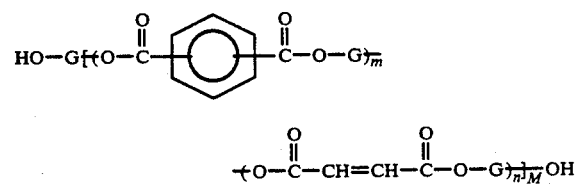

wherein G denotes a glycol residue, m denotes 1 to 10, n denotes 1, and M denotes a number corresponding to a number-average molecular weight greater than 5,000. The high molecular unsaturated polyester of the present invention is an unsaturated polyester having a large molecular weight unattainable by conventional methods, and can find wide application by utilizing its improved physical properties.

8 Claims, 11 Drawing Sheets

HIGH MOLECULAR UNSATURATED POLYESTER

BACKGROUND OF THE INVENTION

1. Field of the Invention

This invention relates to an unsaturated polyester having a large molecular weight and which is useful in the fields of fiber reinforced plastics, linings and castings and a high molecular unsaturated polyester made by blending with this unsaturated polyester a monomer that is copolymerizable therewith.

2. Discussion of the Background

As is well known, unsaturated polyester resins (polyester resins), known as typical radical curing type resins, are widely used as fiber reinforced plastics (hereinafter referred to as FRP), coating materials, lining materials, casting materials and the like.

With the expanded use of unsaturated polyester resins, physical properties required of the resins have, of course, become of a high degree and various methods for improving the properties of this kind of resin have therefore been practiced. For example, methods of improving mechanical properties based on increasing the molecular weight by reaction with diisocyanate, of improving coating performance by reaction with an epoxy resin, and of providing a toughness by using a rubber-like polymer are being practical.

However there is no movement visible at the publicly disclosed level towards solving the problems by increasing the molecular weight of an unsaturated polyester (unsaturated alkyd) constituting an unsaturated polyester resin.

This may be because it is thought that the molecular weight (hereinafter expressed as number-average molecular weight) is at most 2,000 to 2,500 and that it would be very difficult to exceed 3,000 because of gelation during reaction.

In fact, for desired practicality of resulting resins in terms of handling relating to viscosity, curing, moldability and other factors, it is difficult to crack the barrier of a molecular weight of 3,000 only by the esterification reaction ordinarily used for manufacture of unsaturated polyester resins.

An object of the present invention is to provide a novel high molecular unsaturated polyester having improved physical properties and which is widely applicable.

SUMMARY OF THE INVENTION

The inventors of the present application have found that the molecular weight of a high molecular unsaturated polyester can be increased, under conditions described below, to 5,000 or greater which has heretofor been considered unattainable.

The present invention is based on a finding that a polyester resin having an unsaturated polyester structure in a particularly low reactivity region (of a type such that the proportion of $\alpha,\beta$-unsaturated polybasic acid used is smaller, that is, m in the following general formula is greater) and having a molecular weight as defined below has improved physical properties in comparison with low molecular unsaturated polyester resins having a molecular weight of 3,000 or less even if the compositions are the same.

That is, according to one aspect of the present invention, there is provided a high molecular unsaturated polyester having a number-average molecular weight of 5,000 or greater, and is expressed by a general formula:

(where G denotes a residue of glycol, m denotes 1 to 10, n denotes 1, and M denotes a number corresponding to a number-average molecular weight greater than 5,000).

According to another aspect of the present invention, there is provided an unsaturated polyester resin formed by blending the above high molecular unsaturated polyester with a monomer copolymerizable therewith.

According to still another aspect of the present invention, there is provided a method of producing a high molecular unsaturated polyester having a number-average molecular weight of 5,000 or greater, the method comprising the steps of:

a) esterifying an $\alpha,\beta$-unsaturated polybasic acid, a saturated polybasic acid and a polyhydric alcohol by adding or without adding a catalyst for glycol elimination reaction until the acid value thereof is reduced to 15 or less.

adding a catalyst for glycol elimination reaction in case of adding no glycol elimination reaction catalyst in the preceding step; and effecting glycol elimination reaction at a reduced pressure of 5 Torr or less.

DETAILED DESCRIPTION OF THE INVENTION

Raw-materials from which the high molecular unsaturated polyester in accordance with the present invention is composed are the same as those used in the conventional unsaturated polyester resin manufacture process. The following are examples of such materials: a) Practical α,β-unsaturated polybasic acids and acid anhydrides thereof: maleic anhydride, fumaric acid and the like; and b) Saturated polybasic acids having a benzene nucleus: phthalic anhydride, isophthalic acid, terephthalic acid, dimethyl terephthalate ester and the like.

α-glycols in polyhydric alcohols used together with the above polybasic acids are ethylene glycol, propylene glycol and the like.

Diethylene glycol, dipropylene glycol, butanediol 1,3, butanediol 1,4, neopentyl glycol, pentanediol 1,5, hexanediol 1,6 and polyhydric alcohols, such as those listed below, having a high boiling point and difficult glycol interchange can be used as additional materials.

Bisphenol hydride A, adduct of bisphenol A with ethylene oxide, adduct of bisphenol A with propylene oxide, glycerol diallyl ether, trimethylolpropane-mono, and diallyl ether can be used as polyhydric alcohols.

Alkylenemonoepoxy compounds, e.g., ethylene oxide, propylene oxide, epichlorohydrin, phenylglycidyl ether, allylglycidyl ether, can also be used.

In a process for manufacturing the unsaturated polyester in accordance with the present invention:

A) esterification is first effected so that the acid value of unsaturated polyester is 15 or less and, if no glycol elimination reaction catalyst is added, at this stage;

B) a catalyst for glycol elimination reaction is then added, and

C) the glycol elimination reaction is promoted at a reduced pressure of 5 Torr or less, more preferably 1 Torr or less.

The first-stage esterification is effected in an inert gas flow at a temperature of 160° to 230° C. to substantially compose unsaturated polyester having an acid value of 15 or less, more preferably 10 or less.

At this time, it is necessary for the unsaturated polyester to have a molecular weight of 1,000 or greater.

The second-stage glycol elimination reaction (ester interchange reaction) is effected under the presence of a catalyst at a very low pressure.

If at this time the acid value exceeds 15, the glycol elimination reaction is not sufficiently effected and it is difficult to compose a high molecular unsaturated polyester.

As the catalyst, the organic titanium compound can be used. For example, it is tetrabutyl titanate, tetrapropyl titanate or acetyl acetonate of titanium. The amount of this catalyst is 0.01 part by weight or more, preferably 0.01 to 0.5 part by weight, more preferably 0.1 to 0.3 part by weight for 100 parts by weight of unsaturated polyester.

A monomer for dissolving the unsaturated polyester to form a polyester resin is typically a styrene. Other examples of this monomer are vinyl toluene, methyl methacrylate, diallyl phthalate and diallyl terephtalate.

The high molecular saturated polyester resin in accordance with the present invention can be used in the same field as the conventional ordinary-type unsaturated polyester resins. Needless to say, it can be used together with reinforcement fibers, fillers, colorants, mold release agents and stabilizers.

EXAMPLE

An embodiment of the present invention will be described below. Unless otherwise stated, "part" and "molecular weight" denote part by weight and number-average molecular weight respectively.

EXAMPLE 1

915 g of propylene glycol and 1,278 g of isophthalic acid were put in a 3 l separable flask with an agitator, a fractionation condenser, a gas inlet tube and a thermometer, and were esterified in a nitrogen flow at 180° to 190° C. until the acid value was reduced to 29.4. 267 g of fumaric acid was then added and esterification was continued at 190° to 205° C. until the acid value was reduced to 9.0.

Figure 1:
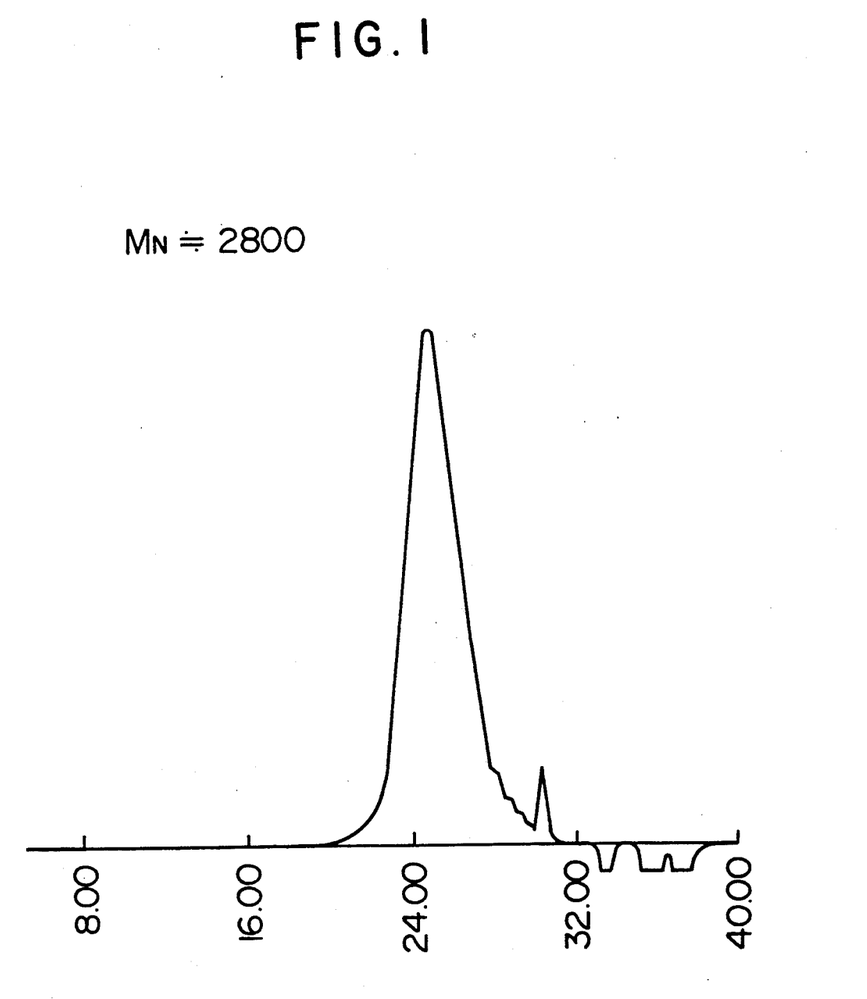
FIG. 1 is a GPC chromatogram of a low molecular unsaturated polyester in accordance with Example 1.

At this stage, 1,000 g of unsaturated polyester (having a molecular weight of 2,800, shown in FIG. 1) was extracted and was dissolved in 725 g of styrene with 0.3 g of hydroquinone, thereby obtaining a low molecular unsaturated polyester resin (A) having a Hazen color value of 250 and a viscosity of 5.3 Poise.

3 g of tetraisopropyl titanate and 0.6 g of hydroquinone were added to the rest of the unsaturated polyester and the material was processed by glycol elimination reaction at 200° to 205° C. while reducing the pressure to a final pressure of 0.8 Torr to increase the molecular weight.

Figure 2:
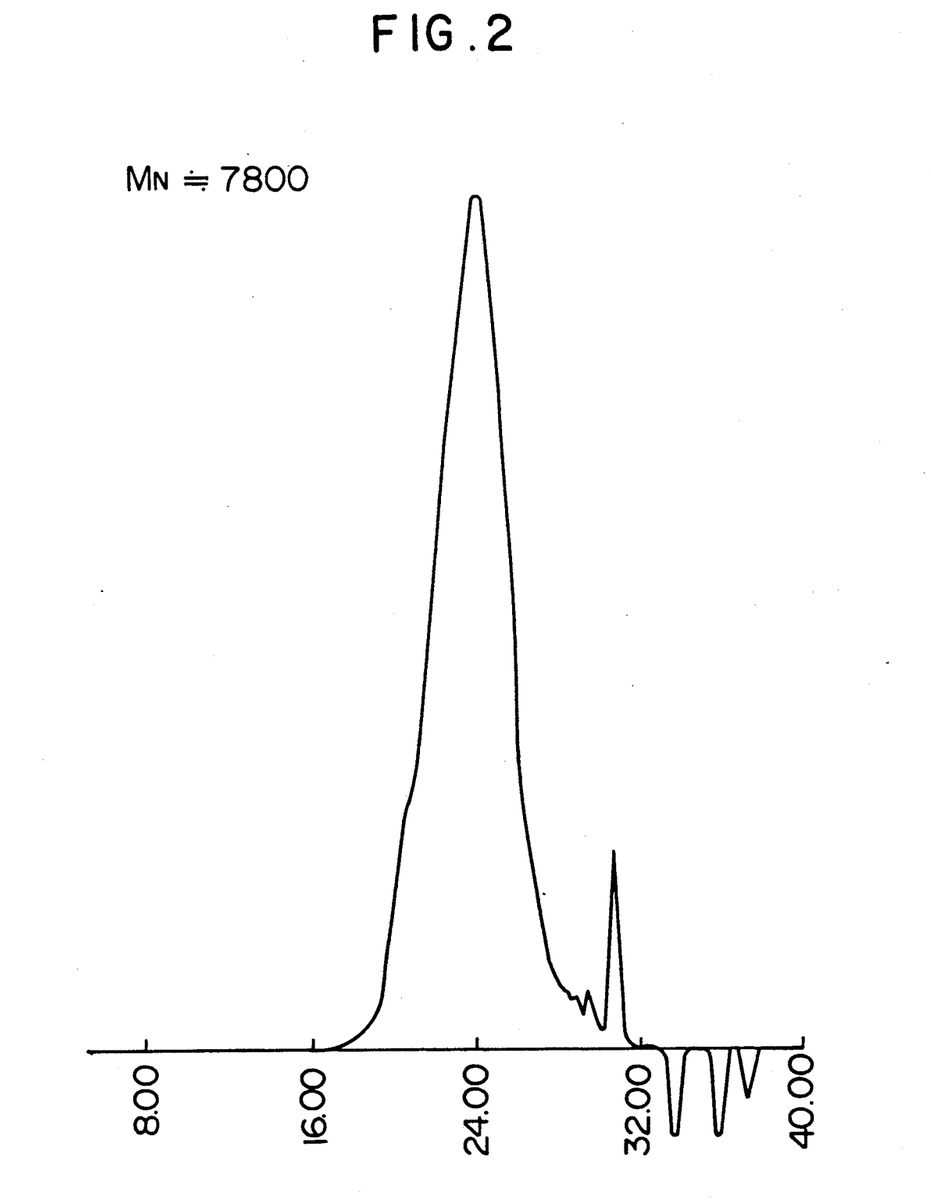
FIG. 2 is a GPC chromatogram of a high molecular unsaturated polyester in accordance with Example 1.

The final molecular weight was 7,800 (FIG. 2).

1,000 g of styrene was added to this material to obtain a high molecular unsaturated polyester resin (B) having a Gardner color value of 2 and a viscosity of 6.9 Poise. This resin is defined by m=3.3 and n=1 in the above-mentioned general formula in accordance with the present invention.

1.5 parts of methyl ethyl ketone peroxide and 0.5 part of cobalt naphthenate (6% Co) were added to 100 parts of each of the resins (A) and (B) and this mixture was cast in a test piece mold, gelatinized and thereafter post-cured at 80° C. for 2 hours and at 120° C. for 2 hours.

The cast cured resins thereby obtained differed greatly in physical properties, as shown in Table 1.

TABLE 1

| | Kinds of resin | |
|---|---|---|
| Properties | Low molecular polyester resin (A) | High molecular polyester resin (B) |
| Tensile strength (kg/mm$^2$) | 4.0 | 7.8 |
| Tensile elongation (%) | ≈2 | ≈3 |
| Tensile elastic modulus (kg/mm$^2$) | 360 | 440 |
| Bending strength (kg/mm$^2$) | 8.3 | 14.9 |
| Bending elastic modulus (kg/mm$^2$) | 310 | 400 |
| Thermal deformation temp. (°C.) | ≈60 | 94 |
| Charpy impact value (kg cm/cm$^2$) | 1.6 | 3.4 |

EXAMPLE 2

280 g of ethylene glycol, 550 g of propylene glycol, 776 g of dimethyl terephthalate and 5 g of zinc acetate were put in a 3 l separable flask with an agitator, a fractionation condenser, a gas inlet tube and a thermometer, and were made to react with each other at 160° to 180° C. When methanol distillation was completed, 664 g isophthalic acid was added and esterification was continued at 180° to 190° C. until the acid value was reduced to 27.1. Then 196 g of maleic anhydride was further added and the reaction was continued until the acid value in a nitrogen flow was reduced to 8.5. The resulting molecular weight was 2,600.

1,000 g of this unsaturated polyester was dissolved in 725 g styrene with 0.2 g of hydroquinone, thereby obtaining a low molecular unsaturated polyester resin (C) having a Hazen color value of 250 and a viscosity of 6.2 Poise.

7 g of tetraisopropyl titanate and 0.5 g of hydroquinone were added to the rest of the unsaturated polyester, the condenser was changed, and glycol elimination reaction was effected at 200° to 205° C. while reducing the pressure to a final pressure of 0.8 Torr to form a high molecular unsaturated polyester having a molecular weight of 7,900. This polyester is defined by m=4 and n=1 in the above-mentioned general formula in accordance with the present invention. 1,100 g of styrene was added to this polyester to obtain a high molecular unsaturated polyester resin (D) having a Gardner color value of 2 and a viscosity of 8.1 Poise.

30 parts of glass flasks of 325 mesh, 1 part of Aerosil, 1 part of a silane coupling agent, 10 ppm of a silicon defoaming agent, 10 parts of titanium white and 10 parts of styrene were added to 100 parts of each of the resins (C) and (D) and this mixture was kneaded to obtain a glass flake compound.

To 100 parts of this compound were added 1 part of methyl ethyl ketone peroxide and 0.5 part of cobalt naphthenate, and this, was applied to a bonderized steel sheet to form a coating having a thickness of 200 μm and was cured.

Table 2 shows the physical properties of each coating after standing one-night including the bonding strength measured with an elcometer. Although the glass flake compound constituted of the low molecular resin was practically unusable, the other glass flake compound constituted by the high molecular unsaturated polyester resin (D) was satisfactory for practical use.

TABLE 2

| | Kinds of resin | |
|---|---|---|
| Properties | Low molecular polyester resin (C) | High molecular polyester resin (D) |
| Surface tackiness | Tacky | Non-tacky, tack-free |
| Polishability | Non-polishable | Polishable |
| Bonding strength by elcometer (kg/mm$^2$) | 10 to 20 separation at interface with bonderized steel sheet | 50 to 70 Cohesive failure in coating layer |
| Over coating | Impractical | Possible |

EXAMPLE 3

912 g of propylene glycol, 1,690 g of dimethyl terephthalate and 8 g of zinc acetate were put in a 3 l separable flask with an agitator, a fractionation condenser, a gas inlet tube and a thermometer, and methanol elimination reaction was effected at 160° to 180° C. After the completion of this reaction, 127 g of maleic anhydride was thereafter added and esterification was effected at 190° to 205° C. in a nitrogen flow until the acid value was reduced to 7.9.

At this stage, 800 g of unsaturated polyester was extracted and dissolved in 600 g of styrene with 0.3 g of hydroquinone, thereby obtaining a low molecular unsaturated polyester resin (E) having a Hazen color value of 200 and a viscosity of 10.9 Poise. The molecular weight of this unsaturated polyester was about 2,000.

2.4 g of tetrabutyl titanate and 0.4 g of hydroquinone were added to the rest of the unsaturated polyester, and this mixture was treated at 200° to 210° C. while reducing the pressure to a final pressure of 0.7 Torr to form high molecular unsaturated polyester having a molecular weight of 9,200. This polyester was dissolved in 800 g of styrene to obtain a high molecular unsaturated polyester resin (F) having a Gardner color value of 2 to 3 and a viscosity of 13.1 Poise. This polyester is defined by m=7 and n=1 in the above-mentioned general formula in accordance with the present invention.

1.5 parts of methyl ethyl ketone peroxide and 0.5 part of cobalt naphthenate (6% Co) were added to 100 parts each of unsaturated polyester resins (E) and (F), and this mixture was applied to a bonderized steel sheet to form a coating having a thickness of 0.2 mm and was then cured.

After standing one-night, the coating of high molecular unsaturated polyester resin (F) was tack-free and could be polished by #300 sand paper, while the coating of low molecular unsaturated polyester resin (E) was tacky at the surface and could not be polished. Thus, these resins differed greatly in properties.

EXAMPLE 4

Figure 3:
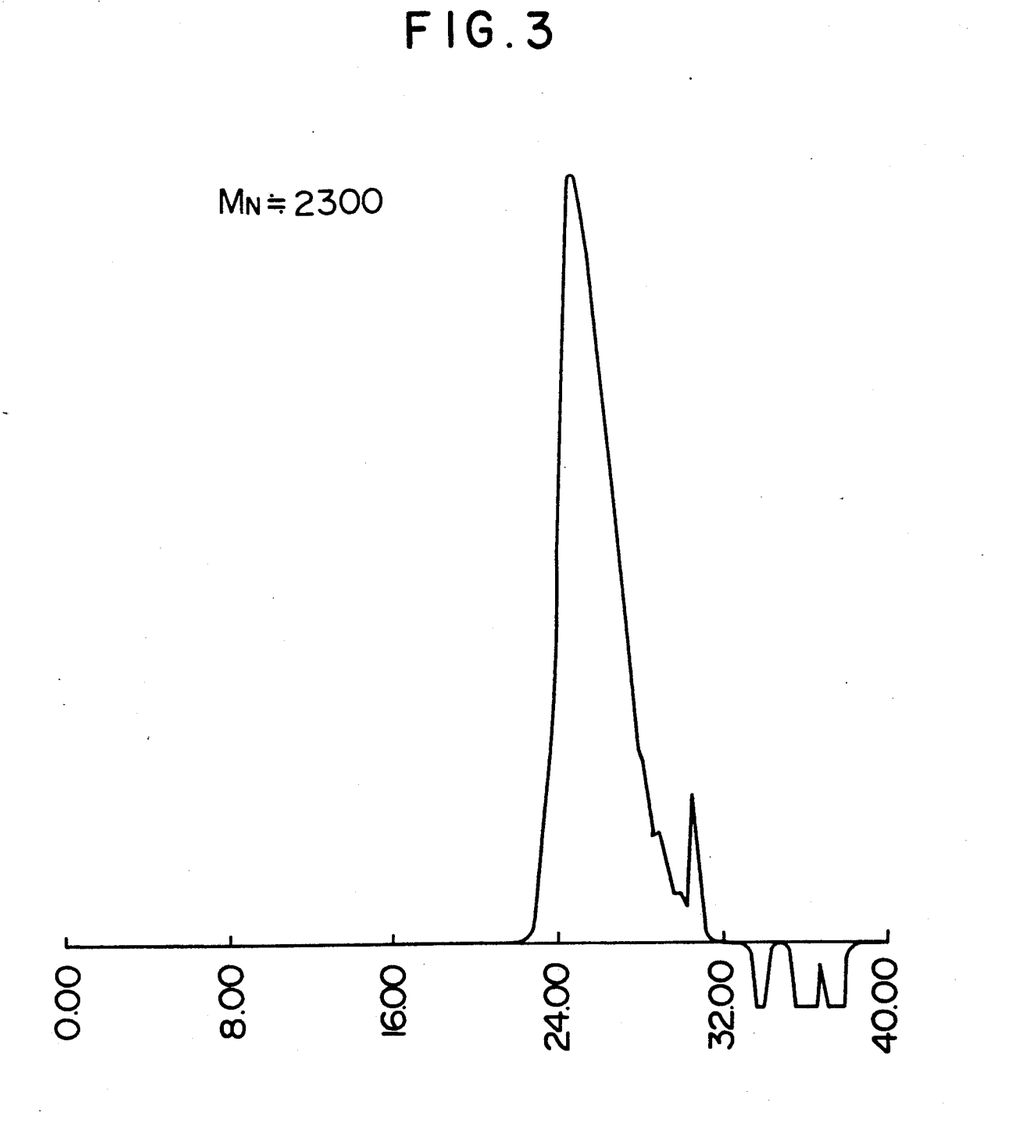
FIG. 3 is a GPC chromatogram of a low molecular unsaturated polyester in accordance with Example 4.
Figure 4:
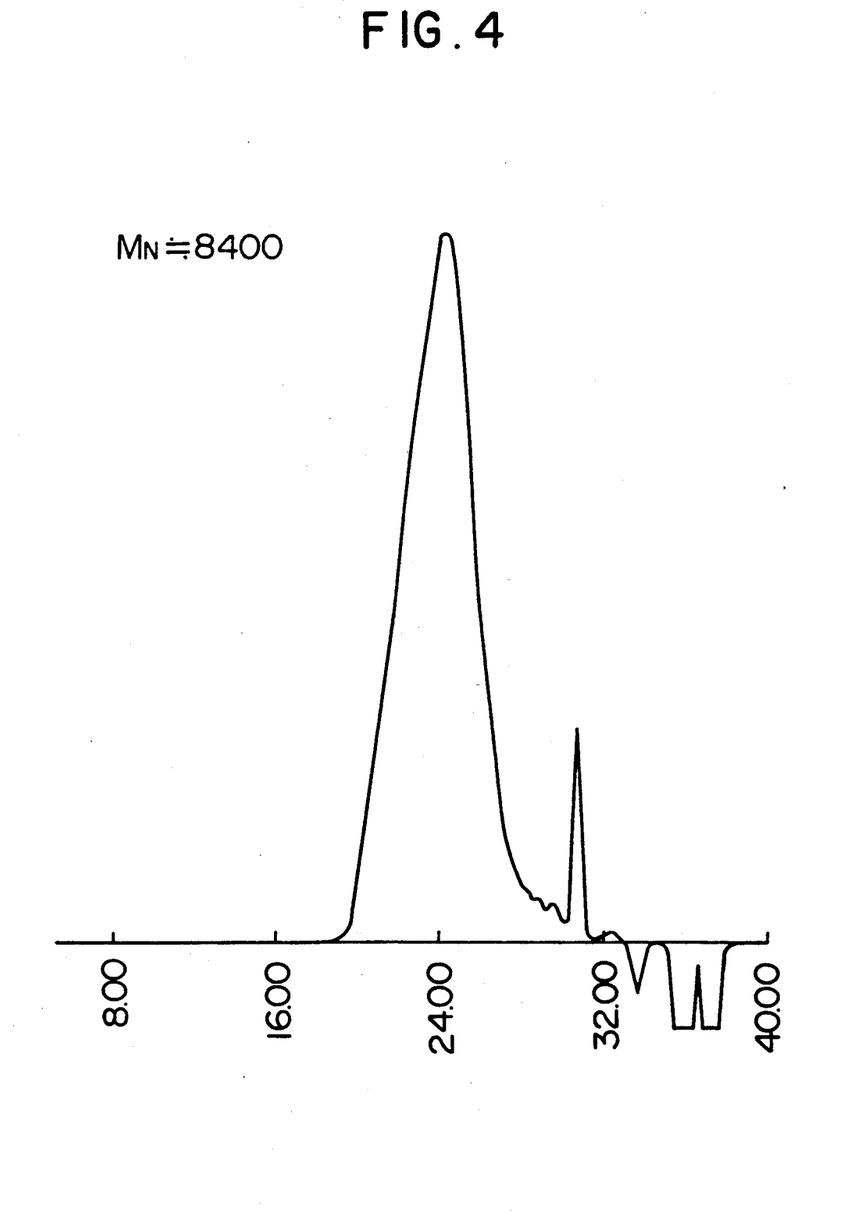
FIG. 4 is a GPC chromatogram of a high molecular unsaturated polyester in accordance with Example 4.

370 g of ethylene glycol, 460 g of propylene glycol and 1,377 g of isophthalic acid were put in a 3 l separable flask with an agitator, a fractionation condenser, a gas inlet tube and a thermometer, and were esterified in a nitrogen flow at 180° to 190° C. until the acid value was reduced to 31.4. 196 g of fumaric acid was then added and esterification was continued until the acid value was reduce to 8.8. The molecular weight at this stage was about 2,300 (FIG. 3).

950 g of this unsaturated polyester was dissolved in 715 g styrene with 0.3 g of hydroquinone, thereby obtaining a low molecular unsaturated polyester resin (G) having a Hazen color value of 300 and a viscosity of 6.9 Poise.

3 g of tetraisopropyl titanate and 0.6 g of hydroquinone were added to the rest of the unsaturated polyester and this mixture was processed by glycol elimination reaction at 195° to 205° C. while reducing the pressure to a final pressure of 0.8 Torr and was dissolved in 1,000 of styrene to obtain a high molecular unsaturated polyester resin (H) having, a Gardner color value of 3 and a viscosity of 8.1 Poise. This resin is defined by m=5 and n=1 in the above-mentioned general formula in accordance with the present invention.

1.2 part of methyl ethyl ketone peroxide and 0.5 part of cobalt naphthenate (6% Co) were added to 100 parts of each of the resins (G) and (H) and this mixture was cast in a suitable mold, gelatinized and thereafter post-cured at 80° C. for 2 hours and at 120° C. for 2 hours.

As shown in Table 3, a high molecular unsaturated polyester resin (H) has improved physical properties after curing.

TABLE 3

| | Kinds of resin | |
|---|---|---|
| Properties | Low molecular polyester resin (G) | High molecular polyester resin (H) |
| Tensile strength (kg/mm$^2$) | 4.7 | 7.1 |
| Tensile elongation (%) | ≈2 | ≈3 |
| Tensile elastic modulus (kg/mm$^2$) | 340 | 460 |
| Bending strength (kg/mm$^2$) | 9.1 | 14.7 |
| Bending elastic modulus (kg/mm$^2$) | 310 | 390 |
| Thermal deformation temp. (°C.) | 60 or lower | 78 |

TABLE 3-continued

| | Kinds of resin | |
|---|---|---|
| Properties | Low molecular polyester resin (G) | High molecular polyester resin (H) |
| Charpy impact value (kg cm/cm$^2$) | 2.1 | 3.6 |

EXAMPLE 5

550 g of propylene glycol and 896 g of isophthalic acid were put in a 2 l separable flask with an agitator, a fractionation condenser, a gas inlet tube and a thermometer, and were made to react with each other in a nitrogen gas flow at 180° to 190° C. until the acid value was reduced to 30.2. 70 g of fumaric acid was thereafter added and esterification was effected at 190° to 210° C.

Figure 5:
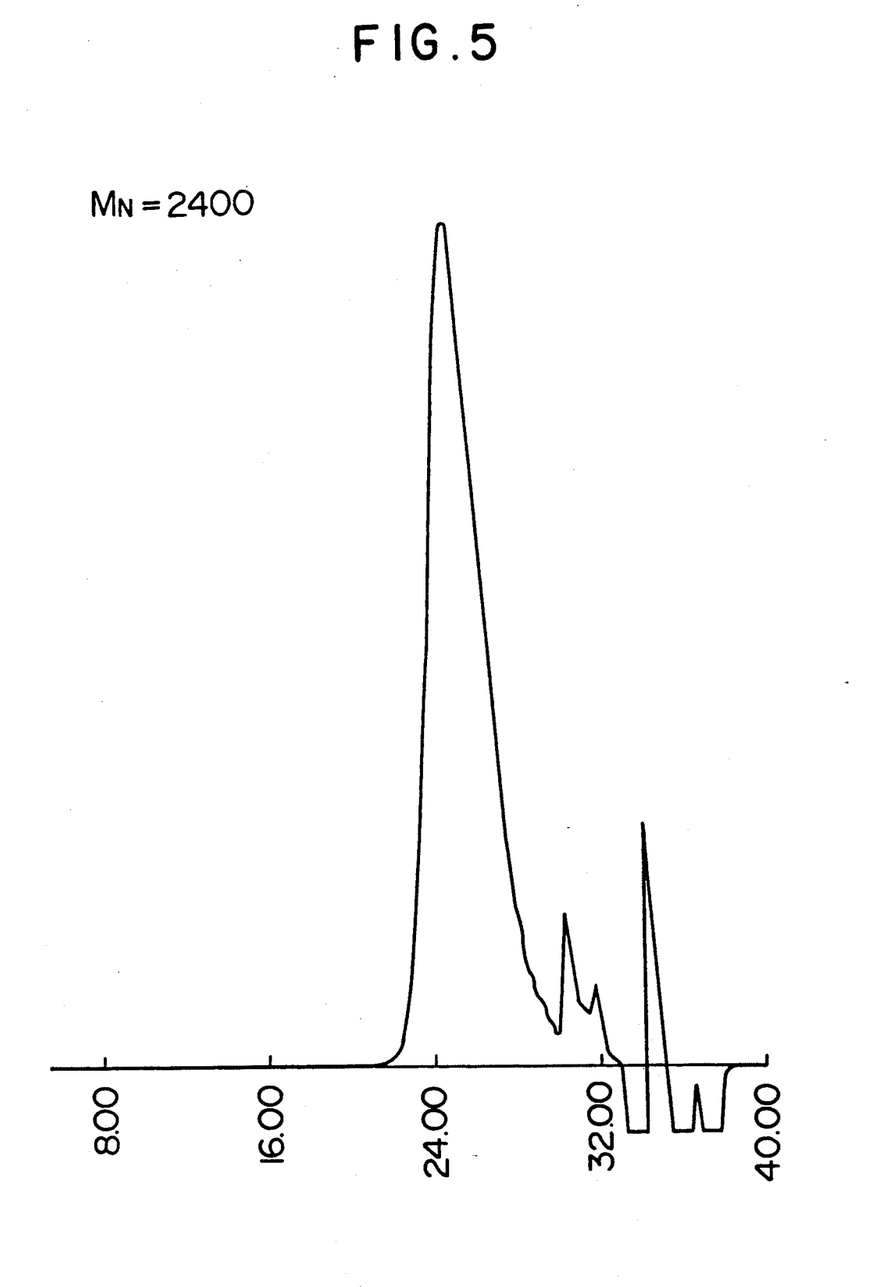
FIG. 5 is a GPC chromatogram of a low molecular unsaturated polyester in accordance with Example 5.

At this stage, 650 g of unsaturated polyester obtained was extracted and dissolved in 450 g styrene with 0.1 g of hydroquinone, thereby obtaining a low molecular unsaturated polyester resin (I) having a Hazen color value of 250 and a viscosity of 7.4 Poise. The molecular weight of this unsaturated polyester was about 2,400 (FIG. 5).

Figure 6:
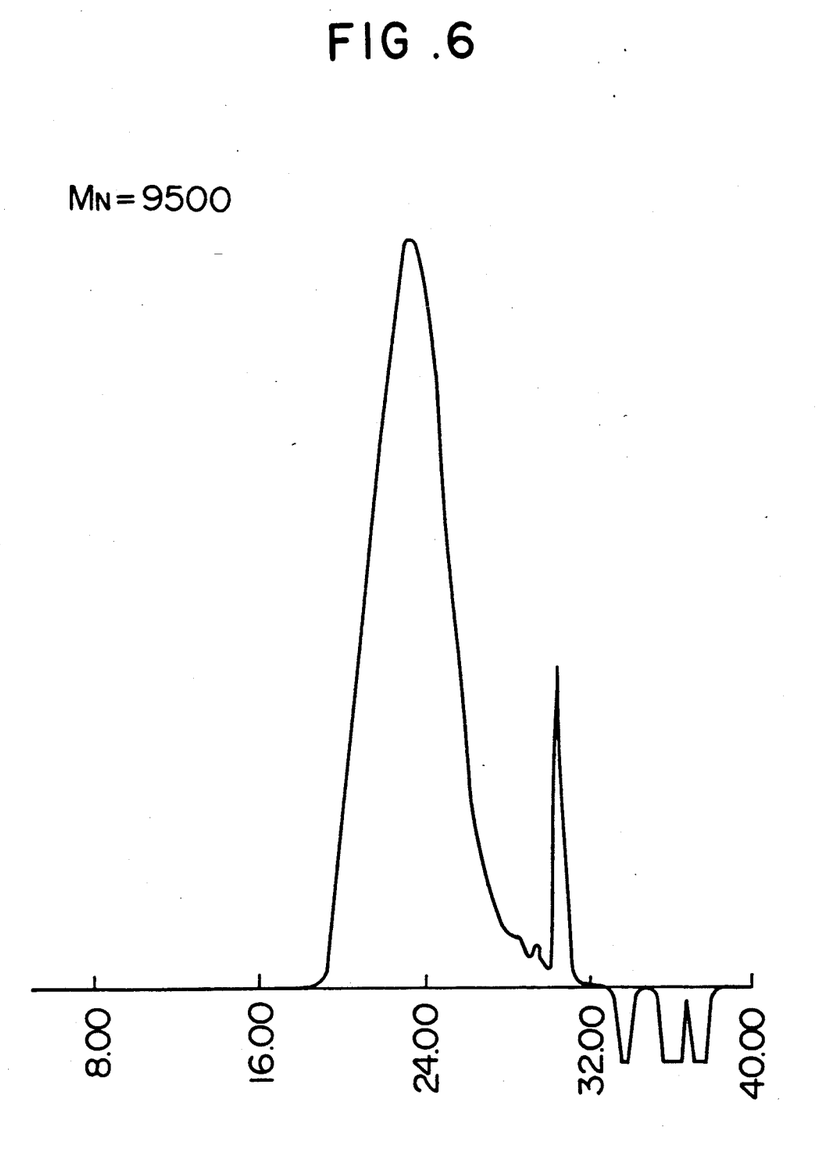
FIG. 6 is a GPC chromatogram of a high molecular unsaturated polyester in accordance with Example 5.

The condenser was changed, 2 g of tetraisopropyl titanate and 0.3 g of hydroquinone were added to the rest of the unsaturated polyester, and this mixture was treated at 190° to 200° C. for 6 hours while reducing the pressure to a final pressure of 0.8 Torr, thereby obtaining a high molecular unsaturated polyester having a molecular weight of 9,500 (FIG. 6). This polyester is defined by m=9 and n=1 in the above-mentioned general formula in accordance with the present invention.

This high molecular unsaturated polyester was dissolved in 630 g of styrene to obtain a high molecular unsaturated polyester resin (J) having a Gardner color value of 3 and a viscosity of 6.9 Poise.

1.5 parts of methyl ethyl ketone peroxide and 0.5 part of cobalt naphthenate (6% Co) were added to 100 parts of each of unsaturated polyester resins (I) and (J), and this mixture was cast in a test piece, gelatinized and thereafter cured by being heated at 80° C. for 2 hours and at 120° C. for 2 hours.

The high molecular unsaturated polyester resin (J) cured in about 13 minutes while about 62 minutes were required to cure the low molecular unsaturated polyester resin (I).

As shown in Table 4, unsaturated polyester resin (J) formed from the unsaturated polyester having a molecular weight of 9,500 had improved physical properties, while the low molecular weight unsaturated polyester resin (I) was not practically usable, thus showing the remarkable effect arising from molecular weight.

TABLE 4

| | Kinds of resin | |
|---|---|---|
| Properties | Low molecular polyester resin (I) | High molecular polyester resin (J) |
| Tensile strength (kg/mm$^2$) | 1.4 | 5.8 |
| Tensile elastic modulus (kg/mm$^2$) | 280 | 510 |
| Bending strength (kg/mm$^2$) | 5.1 | 13.8 |
| Bending elastic modulus (kg/mm$^2$) | 300 | 450 |
| Thermal deformation temp. (°C.) | 40 or lower | 67 |
| Charpy impact value (kg cm/cm$^2$) | 1.2 | 3.8 |

EXAMPLE 6

340 g of ethylene glycol, 380 g of propylene glycol, 970 g of dimethyl terephthalate and 5 g of zinc acetate were put in a 3 l separable flask with an agitator, a fractionation condenser, a gas inlet tube and a thermometer, and a methanol elimination reaction was effected at 170° to 180° C. After the completion of this reaction, 498 g of isophthalic acid was added and esterification was continued until the acid value was reduced to 31. Thereafter 98 g of maleic anhydride was further added and the reaction was continued until the acid value was reduced to 9. The molecular weight of the unsaturated polyester obtained was 2,250.

900 g of the unsaturated polyester was extracted and dissolved in 650 g of styrene with 0.3 g of hydroquinone, thereby obtaining a low molecular unsaturated polyester resin (K) having a Hazen color value of 250 and a viscosity of 11.4 Poise.

The condenser was changed, the rest of the unsaturated polyester was treated at 210° to 215° C. while the pressure was reduced to a final pressure of 0.8 Torr to form a high molecular unsaturated polyester having a molecular weight of 8,600. This polyester is defined by m=8 and n=1 in the above-mentioned general formula in accordance with the present invention.

The temperature of this high molecular unsaturated polyester was reduced to 170° C. and this polyester was dissolved in 1,000 g of styrene with 0.4 g of hydroquinone, thereby obtaining a high molecular unsaturated polyester resin (L) having a Gardner color value of 2 and a viscosity of 8.9 Poise.

1.2 parts of methyl ethyl ketone peroxide and 0.5 part of cobalt naphthenate (6% Co) were added to 100 parts of each of the unsaturated polyester resins (K) and (L), and this mixture was applied to a bonderized steel sheet to form a ooating having a thickness of 0.2 mm.

After standing one-night, the coating of high molecular unsaturated polyester resin (L) was completely tack-free at the surface and could be polished by sand paper. The coating of low molecular unsaturated polyester resin (K) had gelatinized but was tacky. Thus, large differences were recognized between these resins.

EXAMPLE 7

350 g of propylene glycol and 332 g of isophthalic acid were put in a 2 l separable flask with an agitator, a fractionation condenser, a gas inlet tube and a thermometer, and were made to react at 180° to 190° C. until the acid value was reduced to 29.1. Thereafter, the temperature was reduced to 150° C., 232 g of fumaric acid and 0.1 g of hydroquinone were added, and temperature was increased to the previous level to continue esterification. When the acid value was reduced to 8.9 and when the molecular weight was increased to 1,900, 2.5 g of tetraisopropyl titanate was added and the pressure was first reduced to 7 to 10 Torr and finally to 0.8 Torr during reaction at 200° to 205° C. for 1.5 hours. The acid value was thereby reduced to substantially zero.

The reaction was stopped when the unsaturated polyester had a viscosity of about 60 Poise at this temperature, and the material was poured into a metallic vat to be solidified.

Figure 7:
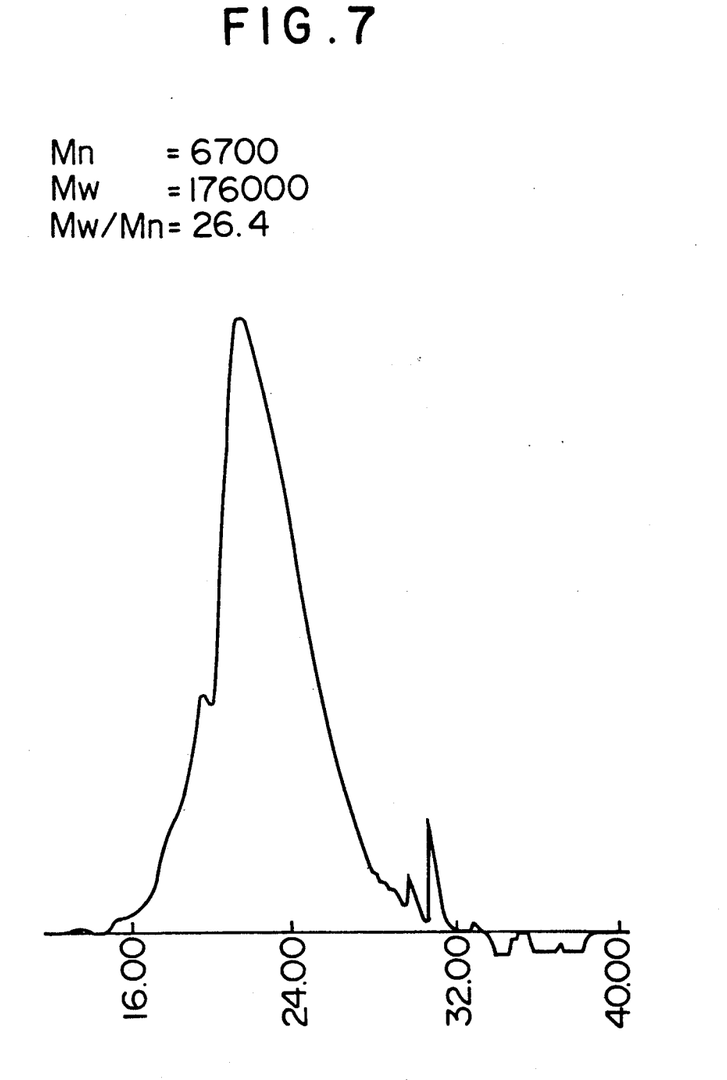
FIG. 7 is a GPC chromatogram of an unsaturated polyester in accordance with Example 7.
Figure 9:
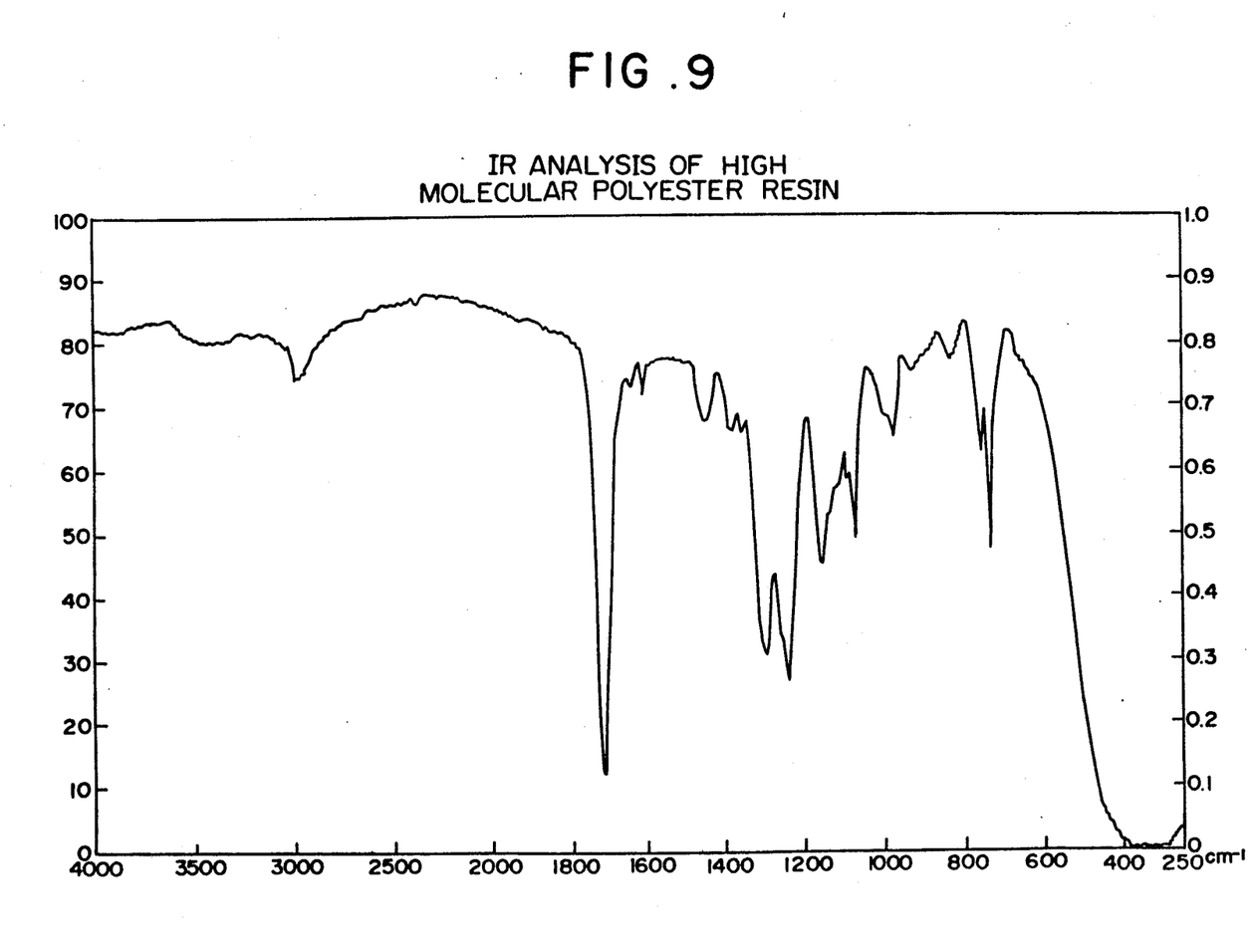
FIG. 9 is a diagram of IR analysis of an unsaturated polyester formed in accordance with Example 7.

A reddish-brown high molecular unsaturated polyester [I] having a melting point of about 90° C., a molecular weight of 6,700 and a weight-average molecular weight of 176,000 measured by GPC (FIG. 7) was obtained FIG. 9 shows the results of IR analysis of this polyester.

COMPARATIVE EXAMPLES 1 and 2

The reaction process was effected under the same conditions as Example 7 expect that no tetraisopropyl titanate was added. In this case, gelation was started immediately after a molecular weight of 3,900 was measured, but the desired high molecular polyester was not obtained.

The same reaction process was also effected by using 330 g of propylene glycol. In this case, the acid value before reducing the pressure was 21.4, and no increase in molecular weight was observed even though the reaction was effected under the same conditions. Gelation was started immediately after an acid value of 13.1 and a molecular weight of 3,800 were measured.

COMPARATIVE EXAMPLE 3

320 g of propylene glycol and 332 g of isophthalic acid were put in a 1 l separable flask and esterification was effected at 180° to 190° C. until the acid value was reduced to 38.4. Thereafter, 232 g of fumalic acid was added as in the above examples, thereby composing a conventional type unsaturated polyester [II] having a final acid value of 28.1.

Figure 8:
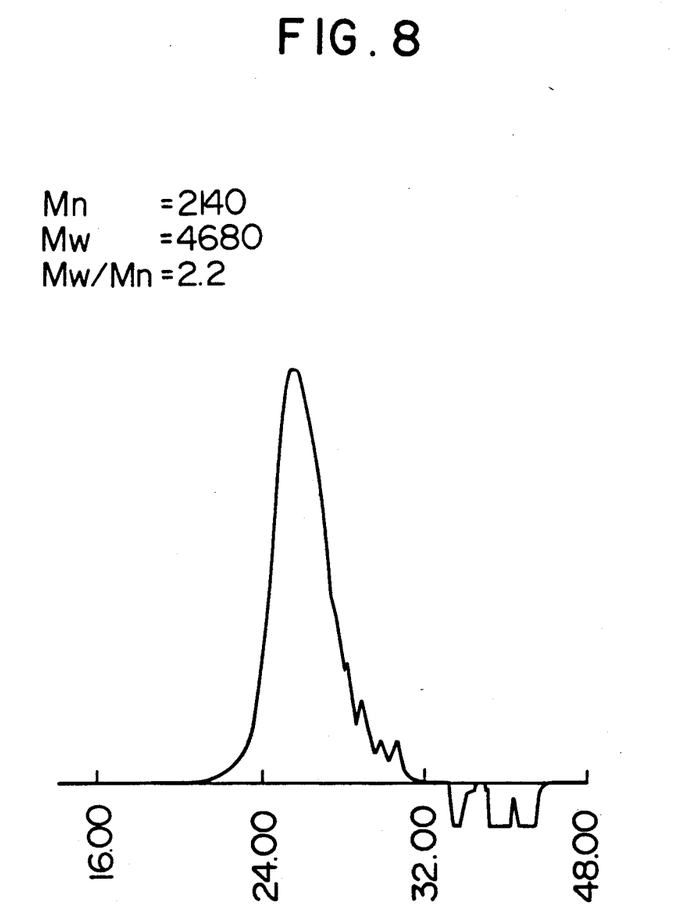
FIG. 8 is a GPC chromatogram of an unsaturated polyester in accordance with Comparative Example 3.

This polyester was light yellowish-brown and had a melting point of about 70° and a molecular weight of 2,140 (FIG. 8).

50 parts of each of the unsaturated polyesters [I] and [II] were dissolved in 50 parts of styrene. Unsaturated polyester resins (M) and (N) were thereby obtained from high molecular unsaturated polyesters [I] and [II], respectively.

Substantially large differences were observed between the physical characteristics of these resins as shown in Table 5, and the superiority of polyester resin (M) formed from high molecular unsaturated polyester resin [I] was confirmed.

TABLE 5

| Properties | High molecular polyester resin (M) | Conventional polyester resin (N) |
|---|---|---|
| Resin solution viscosity (Poise at 25° C.) | 12.8 | 1.0 |
| Cured resin* | | |
| Tensile strength (kg/mm²) | 6.4 | 6.1 |
| Tensile elongation (%) | 2.8 | 2.1 |
| Tensile elastic modulus (kg/mm²) | 400 | 380 |
| Bending strength (kg/mm²) | 14.9 | 13.8 |
| Bending elastic modulus (kg/mm²) | 380 | 340 |
| Thermal deformation temp. (°C.) | 126 | 103 |
| Charpy impact value (kg cm/cm²) | 2.6 | 2.2 |
| Intensity retention rate after continuous boiling for 300 hours (%) | 61 | 32 |
| Rockwell hardness | M-110 | M-105 |

*Resin curing: methyl ethyl ketone peroxide 1 Phr, cobalt naphthenate 0.1 Phr, post curing at 80° C. for 2 hours and at 120° C. for 2 hours after curing at ordinary temperature

EXAMPLE 8

388 g of dimethyl terephthalate, 370 g of propylene glycol and 2.5 g of zinc acetate were put in a 2 l separable flask with an agitator, a fractionation condenser, a thermometer and a gas inlet tube and methanol elimination reaction was effected at 160° to 180° C.

When distillation of methanol was completed, 232 g of fumaric acid was added and esterification was effected in a nitrogen flow at 180° to 190° C. until the acid value was reduced to 9.0. At this time, the molecular weight was 2,320.

The temperature was reduced to 150° C., 0.15 g of hydroquinone and 1.5 g of tetrabutyl titanate were added and the pressure was reduced to a final pressure of 0.8 Torr during reaction at 195° to 205° C.

After necessary glycol elimination reaction for 1 hour, the resin had a viscosity of 69 Poise and was then poured into a metallic vat to be solidified.

Reddish-brown high molecular unsaturated polyester [III] having a melting point of about 100° C., a molecular weight of 6,900 and a weight-average molecular weight of 110,000 was obtained. 50 parts of unsaturated polyester [III] were dissolved in 50 parts of styrene, thereby obtaining high molecular unsaturated polyester resin (O) having a viscosity of 16.4 Poise.

COMPARATIVE EXAMPLE 4

388 g of dimethyl terephthalate, 320 g of propylene glycol and 2.5 g of zinc acetate were put in a 2 l separable flask with an agitator, a fractionation condenser, a thermometer and a gas inlet tube to effect methanol elimination reaction in the same manner. Thereafter, 232 g of fumaric acid was added and esterification was effected at 190° to 200° C. Unsaturated polyester having an acid value of 36.4 and a molecular weight of 2,020 was dissolved in 540 g of styrene with 0.25 g of hydroquinone, thereby obtaining a low molecular unsaturated polyester (P) having a viscosity of 14.1 Poise.

1.5 parts of methyl ethyl ketone peroxide and 0.1 part of cobalt naphthenate were added to 100 parts of each of the resins (O) and (P), and the resin was cast to have the shape of a plate having a thickness of 3 mm.

After gelation at 60° C., the resin was cured at 80° C. for 2 hours and at 120° C. for 2 hours, After curing, the resin plate was cut into test pieces each having a width of 2 cm and a length of 9 cm. These pieces underwent a boiling water immersion test.

As can be understood from the results of this test shown in Table 6, the resin (O) formed from the high molecular unsaturated polyester was much superior to the low molecular polyester.

TABLE 6

| | Kinds of resin | | | |
|---|---|---|---|---|
| | High molecular polyester resin (O) | | Low molecular polyester resin (P) | |
| Boiling time | Bending strength (kg/mm) | Retention rate (%) | Bending strength (kg/mm) | Retention rate % |
| Blank | 14.9 | — | 11.2 | — |
| 150 hours | 12.0 | 93.5 | 9.1 | 80.8 |
| 300 hours | 10.4 | 70.0 | 5.7 | 59.4 |
| 500 hours | 8.2 | 50.4 | 3.9 (Partially cracked) | 34.8 |
| 700 hours | 6.9 | 47.0 | <1 (Cracked over the whole surface) | — |
| 1,000 hours | 6.1* | 40.8 | <1 (Same as above) | — |

*No cracks were observed even after 1,000 hours.

EXAMPLE 9

300 g of ethylene glycol, 296 g of phthalic anhydride and 196 g of maleic anhydride were put in a 2 l separable flask with an agitator, a fractionation condenser, a thermometer and a gas inlet tube, and esterification was effected in a nitrogen flow at 200° to 205° C. until the acid value was reduced to 7.9 and a molecular weight of 1,860 was obtained, Thereafter, 0.16 g of hydroquinone and 2.4 g of tetrapropyl titanate were added and glycol elimination reaction was effected at 190° to 195° C. for 2 hours while reducing the pressure to a final pressure of 1.2 Torr.

A high molecular unsaturated polyester having a molecular weight of 5,900 was obtained. This resin was dissolved in 490 g diallyl terephthalate at 160° C.

A reddish-brown high molecular unsaturated polyester resin (Q) having a viscosity of about 1,000 Poise was finally obtained.

COMPARATIVE EXAMPLE 5

260 g of ethylene glycol, 296 g of phthalic anhydride and 196 g of maleic anhydride were put in a 1 l separable flask with an agitator, a fractionation condenser, a thermometer and a gas inlet tube, and esterification was effected in a nitrogen flow at 200° to 205° C. until the acid value was reduced to 36.4 and a molecular weight of 1,940 was obtained. Thereafter, the material was dissolved in a mixture of 0.16 g of hydroquinone and 290 g of diallyl terephthalate.

Light-yellow low molecular unsaturated polyester resin (R) having a viscosity of about 1,000 Poise was obtained.

Premixes for plastic surgery were produced in accordance with the following composition, and test pieces of the premixes were formed at 160° C. for required times.

Premix [I]

| High molecular polyester resin (Q) | 300 parts |
|---|---|
| Calcium carbonate | 500 parts |
| Zinc stearate | 10 parts |
| Dicumyl peroxide | 7 parts |
| ¼ inch glass fibers | 60 parts |

Premix [II]

This was prepared in accordance with the same composition as Premix [I] except that 300 parts of conventional unsaturated polyester resin (R) were used.

Physical properties of the formed premixes were examined and differences therebetween were recognized as shown in Table 7. Specifically, the difference between heat resisting properties thereof was distinctively large.

TABLE 7

| | Kinds of resin | |
|---|---|---|
| Properties | Premix [I] | Premix [II] |
| Tensile strength (kg/mm$^2$) | 4.9 | 3.1 |
| Tensile elastic modulus (kg/mm$^2$) | 1050 | 950 |
| Bending strength (kg/mm$^2$) | 11.3 | 9.6 |
| Charpy impact value (kg cm/cm$^2$) | 8.0 | 7.5 |
| Thermal deformation temp. (°C.) | >250 | 220 |
| Hot bending strength (kg/mm$^2$) | | |
| 80° C. | 10.4 | 7.1 |
| 120° C. | 8.0 | 5.7 |
| 160° C. | 6.1 | 3.0 |

EXAMPLE 10

915 g of propylene glycol and 830 g of isophthalic acid were put in a 3 l separable flask with an agitator, a fractionation condenser, a gas inlet tube and a thermometer, and were esterified in a nitrogen flow at 180° to 190° C. until the acid value was reduced to 31.4. 580 g of fumaric acid was then added and esterification was continued at 190° to 200° C. until the acid value was reduced to 8.7.

Figure 10:
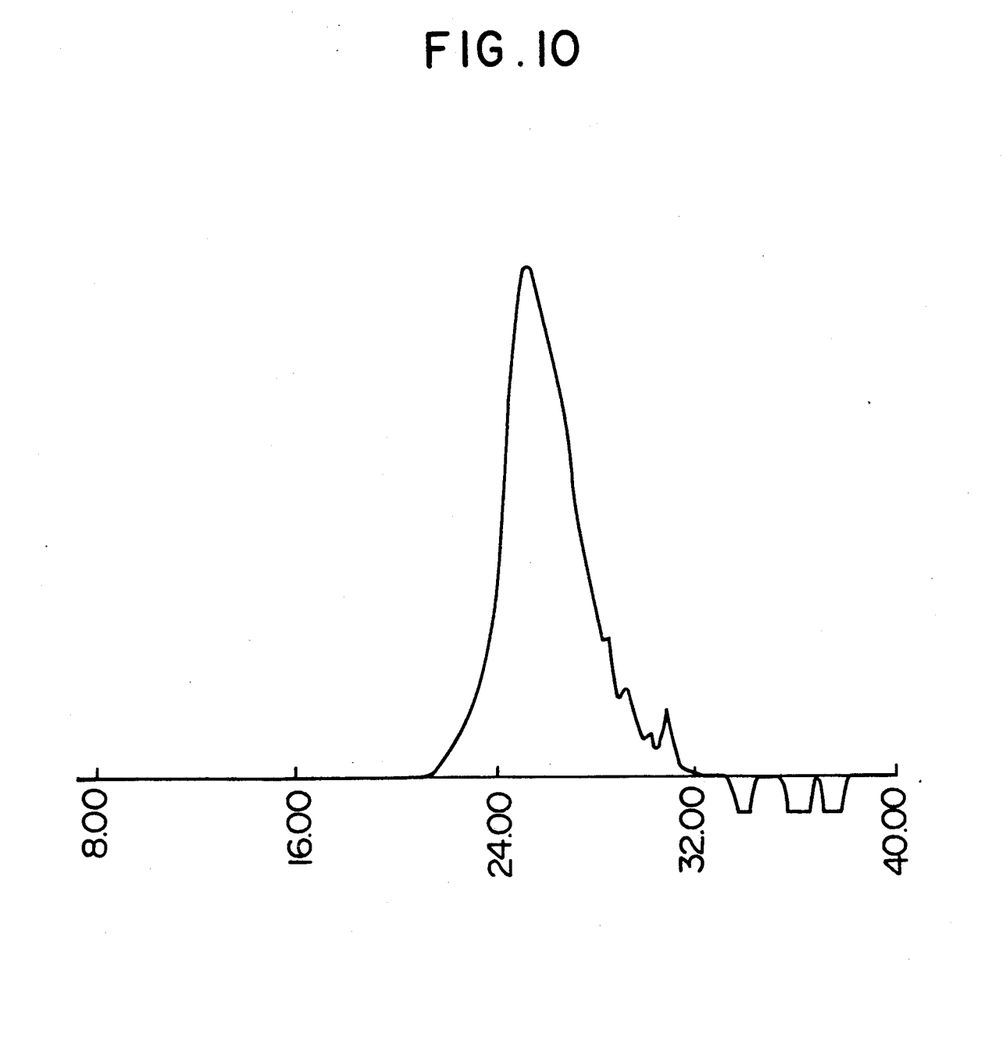
FIG. 10 is a GPC chromatogram of a low molecular unsaturated polyester formed in process for Example 10.

The molecular weight of the unsaturated polyester obtained was 2,300 (FIG. 10).

At this stage, 900 g of unsaturated polyester was extracted and was dissolved in 650 g of styrene with 0.3 g of hydroquinone, thereby obtaining a low molecular unsaturated polyester resin (S) having a Hazen color value of 350 and a viscosity of 6.1 Poise.

The condenser was changed, 6 g of tetraisopropyl titanate and 0.6 g of hydroquinone were added to the rest of the unsaturated polyester and glycol elimination reaction was promoted at 200° to 205° C. while reducing the pressure to a final pressure of 0.8 Torr.

Figure 11:
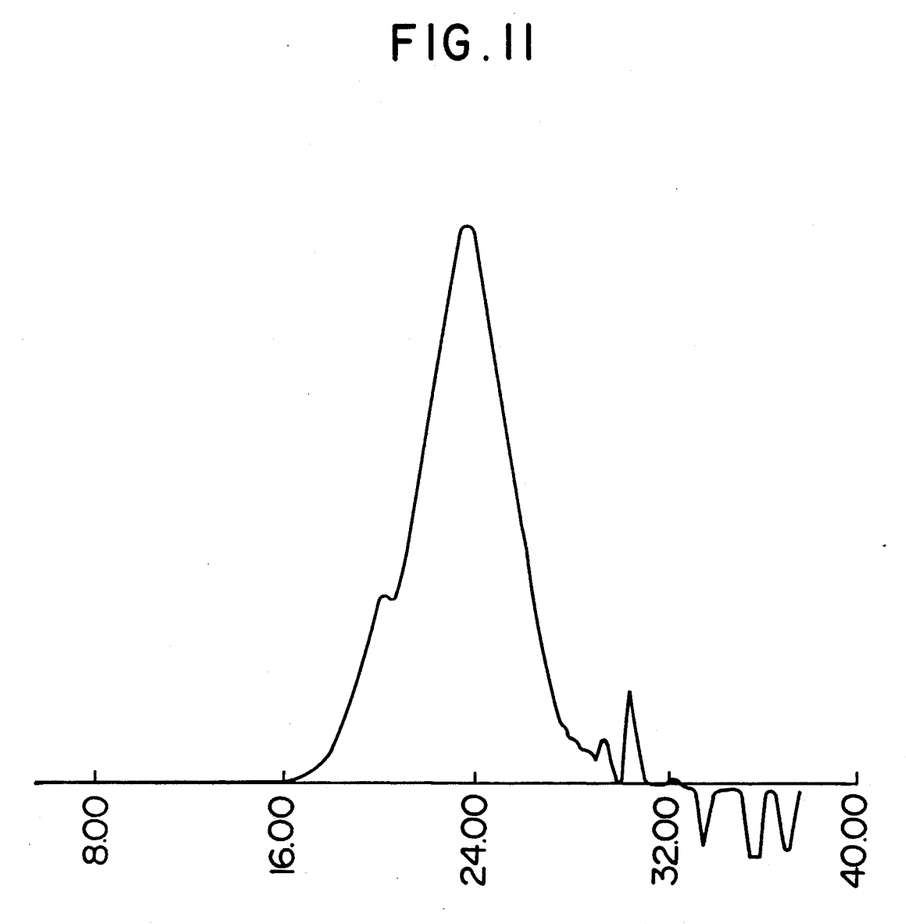
FIG. 11 is a GPC chromatogram of a high molecular unsaturated polyester formed in accordance with Example 10.

The molecular weight of the obtained unsaturated polyester was 7,300 (FIG. 11). This polyester is defined by m=1 and n=1 in the above-mentioned general formula in accordance with the present invention.

This polyester was dissolved in 1,000 g of styrene to obtain a high molecular unsaturated polyester resin (T) having a Gardner color value of 3 and a viscosity of 8.7 Poise.

1.5 part of methyl ethyl ketone peroxide and 0.5 part of cobalt naphthenate were added to 100 parts of each of the resins (S) and (T) and this mixture was gelatinized and thereafter post-cured at 80° C. for 2 hours and at 120° C. for 2 hours.

Cast cured resins thereby obtained differed greatly in physical properties, in particular, in heat resisting properties, as shown in Table 8.

TABLE 8

| Properties | Low molecular polyester resin (S) | High molecular polyester resin (T) |
| --- | --- | --- |
| Tensile strength (kg/mm$^2$) | 5.3 | 7.1 |
| Tensile elongation (%) | ≈2 | ≈2.5 |
| Tensile elastic modulus (kg/mm$^2$) | 380 | 430 |
| Bending strength (kg/mm$^2$) | 12.1 | 14.3 |
| Bending elastic modulus (kg/mm$^2$) | 360 | 390 |
| Thermal deformation temp. (°C.) | 98 | 133 |
| Charpy impact value (kg cm/cm$^2$) | 2 to 2.5 | 3 to 4 |

EXAMPLE 11

225 g of ethylene glycol, 615 g of propylene glycol, 1,260 g of dimethyl terephthalate and 6 g of zinc acetate were put in a 3 l separable flask with an agitator, a fractionation condenser, a gas inlet tube and a thermometer, and were made to react with each other at 160° to 180° C. When methanol distillation was completed, 343 g of maleic anhydride was added and esterification was continued at 200° to 205° C. until the acid value was reduced to 7.9. The unsaturated polyester obtained had a molecular weight of 2,400.

At this stage, 900 g of unsaturated polyester was extracted and was dissolved in 650 g of styrene with 0.3 g of hydroquinone, thereby obtaining a low molecular unsaturated polyester resin (U) having a Hazen color value of 150 and a viscosity of 6.3 Poise.

3 g of tetraisopropyl titanate and 0.5 g of hydroquinone were added to the rest of the unsaturated polyester and glycol elimination reaction was promoted at 200° to 205° C. while reducing the pressure to a final pressure of 0.9 Torr.

The molecular weight of the obtained unsaturated polyester was 7,800. This polyester is defined by m=2 and n=1 in the above-mentioned general formula in accordance with the present invention.

This polyester was dissolved in 1,000 g of styrene to obtain a high molecular unsaturated polyester resin (V) having a Gardner color value of 1 to 2 and a viscosity of 8.1 Poise.

1.5 parts of methyl ethyl ketone peroxide and 0.5 part of cobalt naphthenate (6% Co) were added to 100 parts of each of the resins (U) and (V) and this mixture was gelatinized and thereafter post-cured at 80° C. for 2 hours and at 120° C. for 2 hours.

Table 9 shows the physical properties of these resins. As shown in this table, remarkable improvements were recognized in physical properties, in particular, in the heat resisting properties of the high molecular unsaturated polyester resin of the present invention.

TABLE 9

| Properties | Low molecular polyester resin (U) | High molecular polyester resin (V) |
| --- | --- | --- |
| Tensile strength (kg/mm$^2$) | 6.2 | 8.1 |
| Tensile elongation (%) | ≈2 to 2.5 | ≈3 to 3.5 |
| Tensile elastic modulus (kg/mm$^2$) | 330 | 390 |
| Bending strength (kg/mm$^2$) | 13.6 | 15.4 |
| Bending elastic modulus (kg/mm$^2$) | 340 | 390 |
| Thermal deformation temp. (°C.) | 73 | 108 |
| Charpy impact value (kg cm/cm$^2$) | ≈2 | ≈3 to 4 |

According to the present invention, as described above, it is possible to provide a novel high molecular unsaturated polyester greatly improved in physical properties in comparison with the prior art and to apply this polyester for wide use by utilizing the improved physical properties.

What is claimed is:

1. A high molecular weight unsaturated polyester having a number-average molecular weight of 5,000 or greater, said polyester being represented by a general formula:

$$+O-\overset{O}{\overset{\|}{C}}-CH=CH-\overset{O}{\overset{\|}{C}}-O-G)_{\overline{n}\overline{M}}OH$$

wherein G denotes a glycol residue, m denotes 1 to 10, n denotes 1, and M denotes a number corresponding to a number-average molecular weight greater than 5,000.

2. A high molecular weight unsaturated polyester resin formed by blending, in said high molecular weight unsaturated polyester according to claim 1, a monomer copolymerizable with said polyester.

3. A method of producing a high molecular weight unsaturated polyester having a number-average molecular weight of 5,000 or greater, said method comprising the steps of:
   esterifying an α,β-unsaturated polybasic acid, a saturated polybasic acid and a glycol in the presence or absence of a catalyst for a glycol elimination reaction until the acid value thereof is reduced to 15 or less;
   adding a catalyst for a glycol elimination reaction when no glycol elimination reaction catalyst is present in the preceding step; and
   effecting a glycol elimination reaction at a reduced pressure of 5 Torr or less.

4. A method according to claim 3, wherein the catalyst for a glycol elimination reaction comprises an organic titanium compound.

5. A method according to claim 4, wherein the organic titanium compound is selected from the group consisting of tetrabutyl titanate, tetrapropyl titanate and acetyl acetonate of titanium.

6. A method according to claim 4, wherein 0.01 to 0.05 part by weight of the organic titanium compound is used for 100 parts by weight of unsaturated polyester.

7. A method according to claim 3, wherein the method comprises continuing the esterifying until the acid value is reduced to 10 or less.

8. A method according to claim 3, wherein the glycol elimination reaction is effected at a reduced pressure of 1 Torr or less.

* * * * *